United States Patent
Seo et al.

(10) Patent No.: US 9,516,598 B2
(45) Date of Patent: Dec. 6, 2016

(54) INFORMATION PROCESSING APPARATUS INCLUDING COMMUNICATION FUNCTION

(71) Applicant: CASIO COMPUTER CO., LTD., Shibuya-ku, Tokyo (JP)

(72) Inventors: Munetaka Seo, Tokyo (JP); Kimiyasu Mizuno, Tokyo (JP); Takashi Suenaga, Tokyo (JP); Keiichi Nomura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/842,974

(22) Filed: Sep. 2, 2015

(65) Prior Publication Data
US 2016/0088562 A1   Mar. 24, 2016

(30) Foreign Application Priority Data

Sep. 22, 2014  (JP) .................. 2014-193161
Sep. 22, 2014  (JP) .................. 2014-193162

(51) Int. Cl.
*H04B 1/16* (2006.01)
*H04W 52/02* (2009.01)
*H04W 76/04* (2009.01)

(52) U.S. Cl.
CPC ......... *H04W 52/0251* (2013.01); *H04W 76/04* (2013.01)

(58) Field of Classification Search
CPC ...... H04W 52/00; H04W 52/02; H04B 1/1615
USPC ............... 455/522, 343.1, 343.2, 343.5, 574, 127.1, 455/127.5
See application file for complete search history.

(56) References Cited

U.S. PATENT DOCUMENTS

| 7,536,209 B2 * | 5/2009 | Shoobridge ......... H04B 1/1027 455/127.1 |
| 8,692,833 B2 * | 4/2014 | Hendry ............... G06F 1/3206 345/501 |
| 2014/0045464 A1 * | 2/2014 | Adrangi ............... H04W 12/12 455/411 |

FOREIGN PATENT DOCUMENTS

| JP | 2005267099 A | 9/2005 |
| JP | 2014059187 A | 4/2014 |
| JP | 2014137753 A | 7/2014 |

OTHER PUBLICATIONS

Japanese Office Action (and English translation thereof) dated Sep. 20, 2016, issued in counterpart Japanese Application No. 2014-193161.
Japanese Office Action (and English translation thereof) dated Sep. 20, 2016, issued in counterpart Japanese Application No. 2014-193162.

* cited by examiner

Primary Examiner — Sonny Trinh
(74) Attorney, Agent, or Firm — Holtz, Holtz & Volek PC

(57) ABSTRACT

An information processing apparatus includes: a communication unit that performs wireless communication with an external apparatus; a first control unit that switches between a normal state and a low electric power consumption state that suppresses electric power consumption to less than the normal state; and a second control unit that operates at lower electric power consumption than the first control unit, in which the information processing apparatus controls a connection state of the communication unit with the first control unit and the second control unit, based on a state of the information processing apparatus.

12 Claims, 8 Drawing Sheets

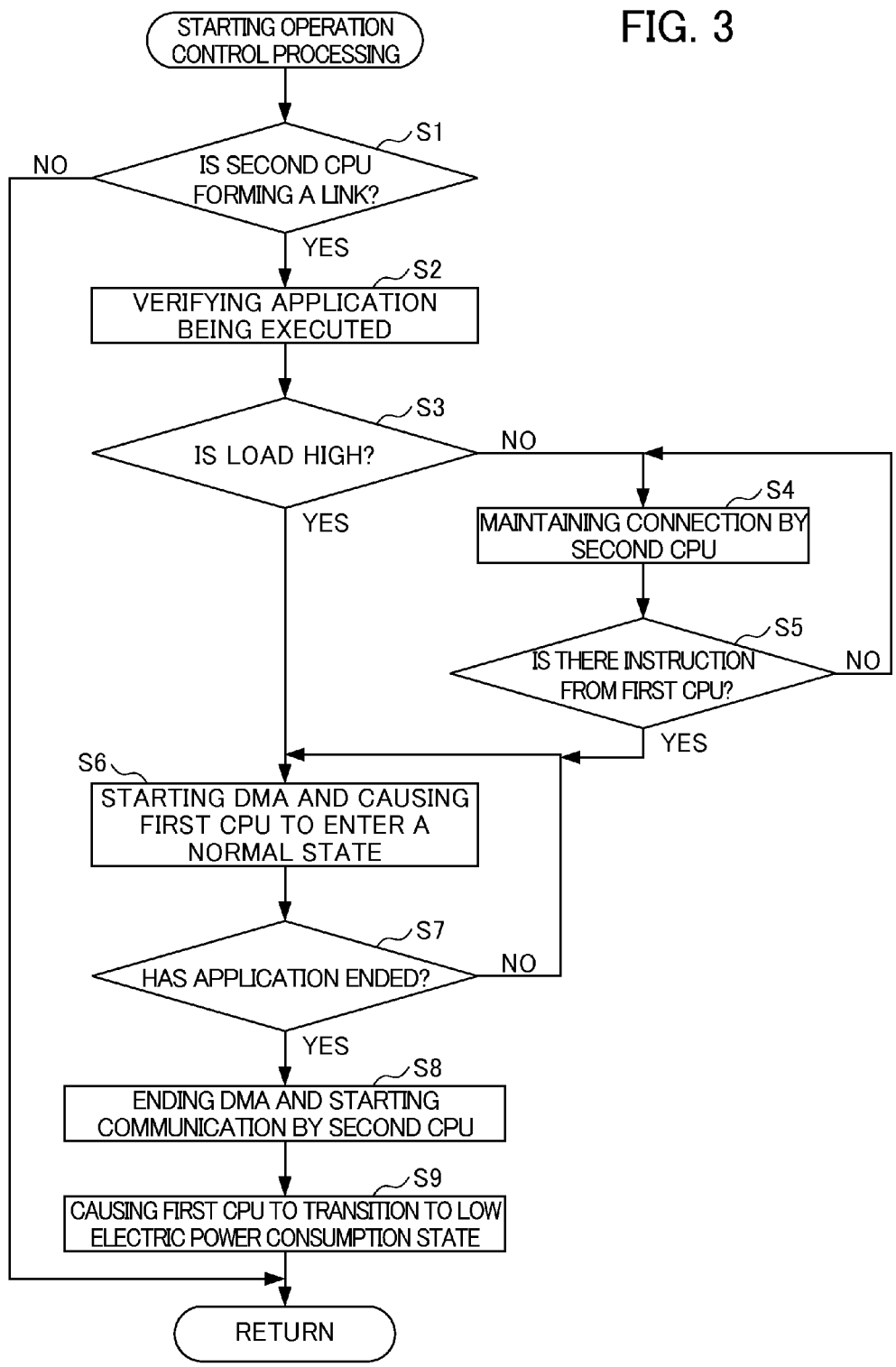

FIG. 4

| STATE | FIRST CPU | COMMUNICATION MODULE | SECOND CPU | CONTENTS OF PROCESSING |
|---|---|---|---|---|
| NORMAL TIME | LOW ELECTRIC POWER CONSUMPTION STATE | CONNECTING WITH SECOND CPU | NORMAL STATE | EXECUTING WIRELESS COMMUNICATION WITH THE PAIR OF THE SECOND CPU AND COMMUNICATION MODULE |
| UPON INCOMING CALL | LOW ELECTRIC POWER CONSUMPTION STATE | CONNECTING WITH SECOND CPU | NORMAL STATE | DRIVING VIBRATION MOTOR FROM SECOND CPU |
| USER PUSHING NOTIFICATION END BUTTON | LOW ELECTRIC POWER CONSUMPTION STATE | CONNECTING WITH SECOND CPU | NORMAL STATE | STOPPING DRIVING VIBRATION MOTOR AND TRANSITIONING TO NORMAL STATE |
| USER PUSHING CALL START BUTTON | NORMAL STATE | CONNECTING WITH FIRST CPU | SWITCHING TO DMA TRANSFER | STARTING VOICE COMMUNICATION OF HIGH LOAD WHILE SECOND CPU OUTPUTTING RETURN INTERRUPT SIGNAL TO FIRST CPU SWITCHING TO DMA TRANSFER AFTER FIRST CPU BEING RESTORED, FIRST CPU BEING CONNECTED WITH COMMUNICATION MODULE VIA SECOND CPU |
| USER PUSHING CALL END BUTTON | LOW ELECTRIC POWER CONSUMPTION STATE | CONNECTING WITH SECOND CPU | SWITCHING FROM DMA TRANSFER TO CONNECTION WITH SECOND CPU | FIRST CPU TRANSITIONING TO LOW ELECTRIC POWER CONSUMPTION STATE DUE TO LOAD SHIFTING TO LIGHT PROCESSING EXECUTING WIRELESS COMMUNICATION WITH THE PAIR OF THE SECOND CPU AND COMMUNICATION MODULE |

FIG. 8

| STATE | FIRST CPU | COMMUNICATION MODULE | SECOND CPU | CONTENTS OF PROCESSING |
|---|---|---|---|---|
| NORMAL TIME | ON | CONNECTING WITH FIRST CPU | ON | EXECUTING WIRELESS COMMUNICATION WITH THE PAIR OF THE FIRST CPU AND COMMUNICATION MODULE |
| LATE EVENING | ELECTRIC POWER SUPPLY OFF | DISCONNECTED FROM FIRST CPU AND COMMUNICATING WITH MOBILE PHONE INDEPENDENTLY | ON | DETERMINING AS SECOND CPU TRANSITIONING TO LOW ELECTRIC POWER CONSUMPTION MODE BASED ON SENSOR INFORMATION, DISCONNECTING FIRST CPU FROM COMMUNICATION MODULE BY SWITCH, TURNING OFF ELECTRIC POWER SUPPLY OF FIRST CPU, AND SECOND CPU WAITING FOR INTERRUPT FROM COMMUNICATION MODULE |
| UPON INCOMING CALL | ELECTRIC POWER SUPPLY OFF | OUTPUTTING INTERRUPT SIGNAL | TURNING ON FIRST CPU ACCORDING TO INTERRUPT SIGNAL | |
| AFTER ACTIVATION | ON | CONNECTING WITH FIRST CPU | ON | TURNING ON FIRST CPU AND RETURNING SWITCH TO ORIGINAL STATE, AND FIRST CPU RECEIVING CONTENTS OF NOTIFICATION FROM COMMUNICATION MODULE |

INFORMATION PROCESSING APPARATUS INCLUDING COMMUNICATION FUNCTION

This application is based upon and claims the benefit of priority from the prior Japanese Patent Application No. 2014-193161, filed Sep. 22, 2014, and the prior Japanese Patent Application No. 2014-193162, filed Sep. 22, 2014, and the entire contents of which are incorporated herein by reference.

BACKGROUND OF THE INVENTION

1. Field of the Invention

The present invention relates to an information processing apparatus including a communication function.

2. Related Art

Conventionally, an information processing apparatus has been known that communicates with other apparatuses using a wireless communication technology such as Bluetooth (Registered Trademark).

In a case of using a wireless communication technology such as Bluetooth, when wireless communication processing is necessary, a wireless communication module interrupts to a control unit such as CPU (Central Processing Unit) to control communication by the control unit.

In this way, it becomes possible to handle wireless communication processing which occurs on an irregular basis by way of communication from outside and, in a case of wireless communication processing not being necessary, it is also possible to realize the reduction of electric power consumption by the control unit transitioning to a state of low electric power consumption, etc.

It should be noted that the technology relating to an information processing apparatus performing wireless communication is disclosed in Japanese Unexamined Patent Application, Publication NO. 2014-137753, for example.

SUMMARY OF THE INVENTION

According to an embodiment of the present invention, an information processing apparatus includes: a communication unit that performs wireless communication with an external apparatus; a first control unit that switches between a normal state and a low electric power consumption state that suppresses electric power consumption to less than the normal state; and a second control unit that operates at lower electric power consumption than the first control unit, in which the information processing apparatus controls a connection state of the communication unit with the first control unit and the second control unit, based on a state of the information processing apparatus.

BRIEF DESCRIPTION OF THE DRAWINGS

FIG. 3 is a flowchart illustrating a flow of operation control processing executed by the information processing apparatus of FIG. 1 having the functional configuration of FIG. 2;

FIG. 4 is a schematic view illustrating an operation example of an information processing apparatus when operation control processing of a first embodiment is executed;

FIG. 8 is a schematic view illustrating an operation example of an information processing apparatus when operation control processing of a second embodiment is executed.

DETAILED DESCRIPTION OF THE INVENTION

In the following, embodiments of the present invention are described with reference to the drawings.

In the embodiments below, an information processing apparatus configured as a wrist-worn type wearable terminal is described, for example. The information processing apparatus is an apparatus that can notify of an incoming call or perform a phone call and data transfer in cooperation with a mobile phone.

First Embodiment

Figure 1:
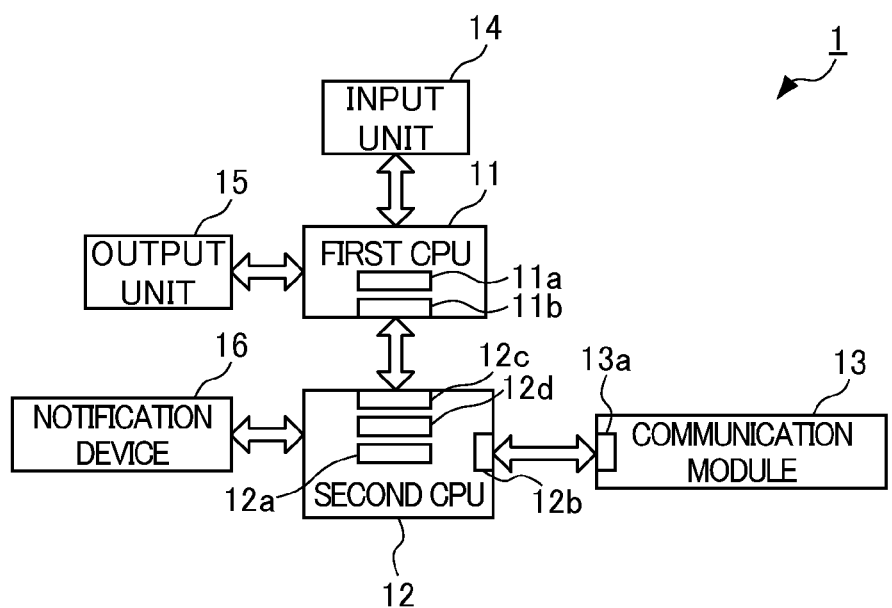
FIG. 1 is a block diagram illustrating a hardware configuration of an information processing apparatus according to a first embodiment of the present application.

FIG. 1 is a block diagram illustrating a hardware configuration of an information processing apparatus 1 according to a first embodiment of the present application.

The information processing apparatus 1 includes a first CPU (Central Processing Unit) 11, a second CPU 12, a communication module 13, an input unit 14, an output unit 15, and a notification device 16.

The first CPU 11 mainly controls the overall information processing apparatus 1 to perform communication with an external apparatus via a communication module 13, and execute various kinds of processing according to various programs.

Furthermore, the first CPU 11 includes a processor core 11a, and a UART (Universal Asynchronous Receiver Transmitter) interface (UARTIF) 11b.

The processor core 11a performs decoding or execution of commands inputted to the first CPU 11.

The UARTIF 11b is an interface for inputting and outputting signals with the second CPU 12.

In the first embodiment, upon performing communication via the communication module 13, the first CPU 11 inputs and outputs signals with the communication module 13 via data transfer (DMA transfer) using DMA (Direct Memory Access) by the second CPU 12. At this time, the first CPU 11 inputs and outputs signals with the second CPU 12 by way of the UARTIF 11b. Furthermore, in a case of matching a predetermined set condition such as in a case of the execution of processing not being necessary, the first CPU 11 enters a low electric power consumption state in which the processor core 11a stops its operation. It should be noted that, when the first CPU 11 is in the low electric power consumption state, in a case in which a return interrupt signal (described later) from the second CPU 12 is input, the processor core 11a of the first CPU 11 restarts an operation and returns from the low electric power consumption state.

The first CPU 11 is configured as a processor having an operation clock frequency of several hundred MHz to several GHz, or more, for example. For the first CPU 11, a general-purpose processor for a smartphone and a tablet PC, for example, can be used.

The second CPU 12 performs control for assisting the first CPU 11 and outputs signals inputted not through the CPU core by way of the DMA transfer to an output destination in a predetermined set condition.

Furthermore, the second CPU 12 includes the processor core 12a, the UARTIFs 12b, 12c, and memory 12d.

The processor core 12a decodes or executes commands inputted to the second CPU 12. In the first embodiment, regarding the second CPU 12, in a case of the first CPU 11 not being in the low electric power consumption state, the processor core 12a enters the low electric power consumption state, and signals inputted to the second CPU 12 are outputted to the first CPU 11 or the communication module 13 by way of the DMA transfer.

The UARTIF 12b is an interface for inputting and outputting signals with the communication module 13. When the processor core 12a is not in the low electric power consumption state, the signals inputted to the UARTIF 12b are outputted to the processor core 12a, and when the processor core 12b is in the low electric power consumption state, the signals inputted to the UARTIF 12b are outputted to the memory 12d for the DMA transfer. Furthermore, the UARTIF 12b outputs the signals inputted from the processor core 12a to the communication module 13, and, in a case of the DMA transfer being performed, the UARTIF 12b reads data stored in the memory 12d not via the processor core 12a, and outputs to the communication module 13.

The UARTIF 12c is an interface for inputting and outputting signals with the first CPU 11. When the processor core 12a is not in the low electric power consumption, the signals inputted to the UARTIF 12c are outputted to the processor core 12a, and when the processor core 12a is in the low electric power consumption state, the signals are outputted to the memory 12d for the DMA transfer. Furthermore, the UARTIF 12c outputs the signals inputted from the processor core 12a to the first CPU 11, and, in a case of the DMA transfer being executed, reads data stored in the memory 12d not via the processor core 12a, and outputs to the first CPU 11.

In the first embodiment, when the first CPU 11 is in the low electric power consumption state, the second CPU 12 processes signals inputted from the communication module 13, drives a notification device 16 in response to the signals thus inputted, and outputs to the first CPU 11 a return interrupt signal for restoring the first CPU 11 from the low electric power consumption state. Furthermore, in a case of the first CPU 11 and the communication module inputting and outputting signals, the second CPU 12 outputs signals inputted not via the processor core 12a by way of the DMA transfer. At this time, the second CPU 12 inputs and outputs the signals with the first CPU 11 and the communication module 13 by way of the UARTIFs 12b and 12c. The second CPU 12 can be configured as a processor of lower electric power consumption than the first CPU 11, and for example, can be configured with a processor having an operation clock frequency of no more than several tens of MHz. For the second CPU 12, a microcomputer intended for an embedded device can be used, for example.

The communication module 13 performs wireless communication by way of Bluetooth according to the control of the first CPU 11 or the second CPU 12. In the first embodiment, the communication module 13 handles the two communication modes of legacy mode and low energy mode.

Furthermore, the communication module 13 includes the UARTIF 13a.

The UARTIF 13a is an interface for inputting and outputting signals with the second CPU 12.

In the first embodiment, the UARTIF 11b of the first CPU 11, the UARTIFs 12b, 12c of the second CPU 12, and the UARTIF 13a of the communication module 13 are input/output interfaces that perform data transfer in the same data format, respectively.

The input unit 14 is configured with a microphone, various buttons, etc. and inputs various kinds of information according to a user's operation.

The output unit 15 is configured with a display, a speaker, etc. and outputs images and sounds.

The notification device 16 includes a vibration motor that causes the information processing apparatus 1 to vibrate and, according to the control of the second CPU 12, notifies the user of various kinds of events such as an incoming call and receiving of mail.

It should be noted that, in addition to the abovementioned hardware, the information processing apparatus 1 can include various kinds of hardware as appropriate such as an image capture unit that captures images, a storage unit that stores various kinds of information and a drive of a removable medium.

Figure 2:
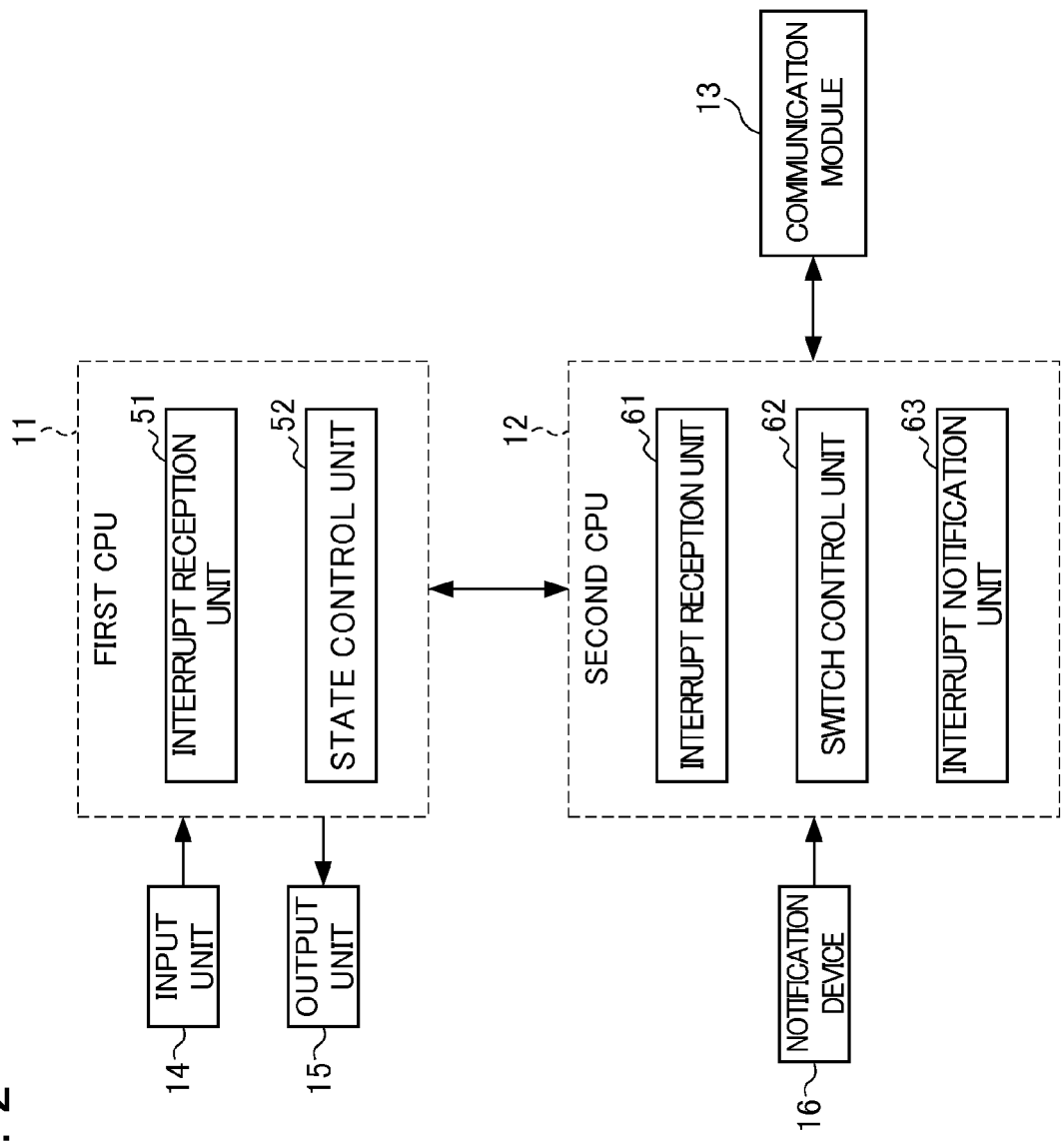
FIG. 2 is a functional block diagram illustrating a functional configuration for executing operation control processing among the functional configurations of the information processing apparatus of FIG. 1.

FIG. 2 is a functional block diagram illustrating a functional configuration for executing operation control processing among the functional configurations of the information processing apparatus 1.

The operation control processing refers to a sequence of processing of switching between transitioning to the low electric power consumption state in the first CPU 11 and executing the DMA transfer in the second CPU 12 according to conditions of the information processing apparatus 1.

When the operation control processing is executed, as illustrated in FIG. 2, an interrupt reception unit 51 and a state control unit 52 function in the first CPU 11 and an interrupt reception unit 61, a switch control unit 62, and an interrupt notification unit 63 function in the second CPU 12.

The interrupt reception unit 51 receives an interrupt signal from the second CPU 12. More specifically, in a case in which the processor core 11a is in the low electric power consumption state, when the interrupt reception unit 51 receives from the second CPU 12 an interrupt signal (hereinafter, referred to as "return interrupt signal") to return the processor core 11a to a state for performing normal operation (normal state), the interrupt reception unit 51 returns the processor core 11a from the low electric power consumption state to the normal state. Furthermore, in a case in which the processor core 11a is in the normal state, when the interrupt reception unit 51 receives an interrupt signal relating to communication inputted from the second CPU 12 by the communication module 13 (hereinafter, referred to as "communication interrupt signal"), the interrupt reception unit 51 outputs the communication interrupt signal to the processor core 11a.

The state control unit 52 switches the first CPU 11 between the low electric power consumption state and the normal state according to a predetermined set condition (hereinafter, referred to as "condition for transitioning to low electric power consumption mode"). Here, as the condition for transitioning to low electric power consumption mode, it is possible to define a variety of cases in which processing by the first CPU 11 is unnecessary. In the first embodiment, it is configured such that, when communication on a phone is performed by the information processing apparatus 1 or file transfer is performed via the communication module 13, the first CPU 11 is set to be in the normal state, and in the other cases, the first CPU 11 is set to be in the low electric power consumption state and the second CPU 12 executes processing.

In the second CPU 12, the interrupt reception unit 61 receives an interrupt signal inputted from the communication module 13.

The switch control unit 62 switches whether or not to execute the DMA transfer in the second CPU 12. More specifically, in a case in which the interrupt signal from the communication module 13 is received by the interrupt reception unit 61, when the contents of interrupt indicated by the interrupt signal is an incoming call and receiving a file, the switch control unit 62 switches to a state performing the DMA transfer in the second CPU 12. Furthermore, in a case in which an instruction signal for performing communication (communication on a phone, file transfer, etc.) via the communication module 13 is inputted from the first CPU 11, the switch control unit 62 switches to a state performing the DMA transfer in the second CPU 12. On the other hand, the switch control unit 62 judges whether processing at the information processing apparatus 1 matches the condition for transitioning to low electric power consumption mode, and in a case of the state of the communication module 13 and the first CPU 11 not performing communication, the switch control unit 62 switches to the state of not performing the DMA transfer in the second CPU 12.

In a case of the state of performing the DMA transfer in the second CPU 12, the switch control unit 62 sets the second CPU 12 (more specifically, the processor core 12a) to be in the low electric power consumption state, and switches an input/output destination of the UARTIF 12b, 12c from the processor core 12a to the memory 12d. It should be noted that, in the case of not performing the DMA transfer in the second CPU 12, the switch control unit 62 restores the processor core 12a of the second CPU 12 and sets the second CPU 12 to the normal state.

When the interrupt signal from the communication module 13 is received by the interrupt reception unit 61, the interrupt notification unit 63 outputs the interrupt signal to the first CPU 11. More specifically, in a case in which the interrupt signal from the communication module 13 is received by the interrupt reception unit 61, when the processor core 11a is in the low electric power consumption state, the interrupt notification unit 63 outputs the return interrupt signal. Furthermore, in a case in which the interrupt signal from the communication module 13 is received by the interrupt reception unit 61, the interrupt notification unit 63 outputs the communication interrupt signal in the case of the processor core 11a not being in the low electric power consumption state and after the processor core 11a returning from the low electric power consumption state.

In this way, in a case in which the state of the information processing apparatus 1 matches the condition for transitioning to the low electric power consumption mode to set the first CPU 11 to the low electric power consumption state, the information processing apparatus 1 sets the first CPU 11 to the low electric power consumption state, and also sets a state in which the second CPU 12 performs processing of light load. Then, in a case of it being necessary to perform processing of heavy load such as when a phone call or file transfer is performed, the second CPU 12 restores the first CPU 11 from the low electric power consumption state to the normal state, and the second CPU 12 enters a state performing the DMA transfer between the first CPU 11 and the communication module 13 (hereinafter, referred to as "low electric power consumption mode").

Next, operations will be described.

FIG. 3 is a flowchart illustrating a flow of operation control processing executed by the information processing apparatus 1 of FIG. 1 having the functional configuration of FIG. 2.

The operation control processing is started in conjunction with power activation of the information processing apparatus 1, and is repeatedly executed until the electric power is turned OFF.

In Step S1, the switch control unit 62 of the second CPU 12 judges whether the second CPU 12 has formed a link with an external apparatus.

In a case in which the second CPU 12 has formed a link with an external apparatus, it is judged as YES in Step S1, and the processing advances to Step S2.

On the other hand, in a case in which the second CPU 12 has not formed a link with an external apparatus, it is judged as NO in Step S1, and the operation control processing is repeated.

In Step S2, the switch control unit 62 verifies an application that is being executed in the second CPU 12.

In Step S3, the switch control unit 62 judges whether the load of the application being executed in the second CPU 12 is high or not. At this time, the switch control unit 62 can judge whether the load of the application being executed by the second CPU 12 is high or not, for example, depending on whether the application being executed in the second CPU 12 is communication on a phone or file transfer, etc., which are defined beforehand as processing having high load.

In a case in which the load of the application being executed in the second CPU 12 is not high, it is judged as NO in Step S3, and the processing advances to Step S4.

On the other hand, in a case in which the load of the application being executed in the second CPU 12 is high, it is judged as YES in Step S3, and the processing advances to Step S6.

In Step S4, the switch control unit 62 maintains communication with an external apparatus via the communication module 13 by way of the second CPU 12.

In Step S5, the switch control unit 62 judges whether an instruction signal for performing communication via the communication module 13 has been inputted from the first CPU 11.

In a case in which the instruction signal for performing communication via the communication module 13 has not been inputted from the first CPU 11, it is judged as NO in Step S5, and the processing advances to Step S4.

On the other hand, in a case in which the instruction signal for performing communication via the communication module 13 has been inputted from the first CPU 11, it is judged as YES in Step S5, and the processing advances to Step S6.

In Step S6, the switch control unit 62 causes the second CPU 12 to enter the state of performing the DMA transfer, and the interrupt notification unit 63 outputs a return interrupt signal and a communication interrupt signal to the first CPU 11. In response, the state control unit 52 of the first CPU 11 switches the first CPU 11 to a normal state to enter a state in which communication via the communication module 13 is performed in the first CPU 11.

In Step S7, the switch control unit 62 judges whether an application of high load being executed in the second CPU 12 has ended.

In a case in which the application of high load being executed in the second CPU 12 has not ended, it is judged as NO in Step S7, and the processing advances to Step S6.

On the other hand, in a case in which the application of high load being executed in the second CPU 12 has ended, it is judged as YES in Step S7, and the processing advances to Step S8.

In Step S8, the switch control unit 62 causes the second CPU 12 to enter the state of not performing the DMA transfer, and performs communication with an external apparatus via the communication module 13 by way of the second CPU 12.

In Step S9, the state control unit 52 switches the first CPU 11 to enter the low electric power consumption state. In other words, the information processing apparatus 1 transitions to the low electric power consumption mode.

After Step S9, the operation control processing is repeated.

FIG. 4 is a schematic view illustrating an operation example of the information processing apparatus 1 when the operation control processing is executed.

As illustrated in FIG. 4, for the information processing apparatus 1, in a normal state, the first CPU 11 is set to be in the low electric power consumption state and the second CPU 12 is set to be a normal state. At this time, the communication module 13 is in a state being connected with the second CPU 12.

In such a case, the information processing apparatus 1 enters a state of operating with low electric power consumption in which only communication of simple signals can be performed such as an instruction for a vibration operation from a mobile phone of a connection destination, etc.

Then, when the communication module 13 receives a signal indicating an incoming call from a mobile phone, etc. of a connection destination, an interrupt signal is outputted to the second CPU 12 from the communication module 13, and the second CPU 12 drives a vibration motor of the notification device 16.

When the user performs an operation to end a notification operation of the notification device 16, the second CPU 12 stops driving the vibration motor of the notification device 16 and returns to a normal state. At this time, a state of the communication module 13 and the second CPU 12 being connected is maintained.

On the other hand, when the communication module 13 receives a signal indicating an incoming call from a mobile phone, etc. of a connection destination and the user pushes a call start button, the second CPU 12 outputs a return interrupt signal to the first CPU 11, and sets the first CPU 11 to be in a normal state and the second CPU 12 transitions to a state of performing the DMA transfer. At this time, in response to the communication interrupt signal inputted from the second CPU 12, the first CPU 11 enters a state of being connected with the communication module 13 via the DMA transfer in the second CPU 12. In this way, the information processing apparatus 1 can execute processing of high load.

Thereafter, when the user pushes a call end button, the first CPU 11 transitions to the low electric power consumption state again, and the second CPU 12 transitions to a normal state. At this time, the second CPU 12 enters a state of not performing the DMA transfer, and enters a state of being connected with the communication module 13.

The information processing apparatus 1 as configured above includes the communication module 13, the first CPU 11, the second CPU 12, and the UARTIFs 11b, 12b, 12c and 13a.

The communication module 13 performs wireless communication with an external apparatus.

The first CPU 11 can switch between a low electric power consumption state in which the execution of processing is suppressed, and a normal state of executing processing.

The second CPU 12 is connected between the communication module 13 and the first CPU 11, and can operate with lower electric power consumption than the first CPU 11, and allows for data transfer by way of direct memory access.

The UARTIFs 11b, 12b, 12c and 13a are provided to the communication module 13, the first CPU 11, and the second CPU 12, respectively, and inputs and outputs data in the same data format.

In this way, it is possible to switch between the state of the second CPU 12 being connected with the communication module 13 and the state of the communication module 13 and the first CPU 11 being connected by way of the second CPU 12 performing the data transfer by direct memory access. Then, when the first CPU 11 is not connected with the communication module 13, it is possible to set to the low electric power consumption state.

Therefore, it is possible to realize the reduction of electric power consumption more effectively in an information processing apparatus having a wireless communication function.

Furthermore, when the state of processing in the information processing apparatus 1 matches a predetermined set condition, the second CPU 12 sets the first CPU 11 to be in the low electric power consumption state, and sets a state in which the second CPU 12 is connected with the communication module 13.

In this way, it is possible to set the first CPU 11 to be in the low electric power consumption state in response to a processing state of the information processing apparatus 1, and it is possible to achieve a reduction in electric power consumption more effectively.

Furthermore, in a case of processing that should be performed by the first CPU 11 arising, the second CPU 12 sets the first CPU 11 to be in a normal state and connects the communication module 13 with the first CPU 11 by way of direct memory access via the UARTIFs 12b and 12c, and then, the second CPU 12 enters the low electric power consumption state in which the execution of processing is suppressed.

In a case in which it is necessary to perform processing by the first CPU 11, it is thereby possible to connect the first CPU 11 with the communication module 13, and it is thereby possible to connect the communication module 13 with the second CPU 12 in other cases; therefore, it is possible to realize the reduction of electric power consumption more effectively.

In the abovementioned first embodiment, an explanation is providing by giving the example of the processor core 12a entering the low electric power consumption state in the case of the second CPU 12 entering a state of performing the DMA transfer. However, the present invention is not limited thereto.

In other words, it may be configured such that, in the case of the first CPU 11 entering a normal state, the DMA transfer is performed while the processor core 12a of the second CPU 12 also maintains a normal state. In such a case as well, since it is possible to set the first CPU 11 which consumes electric power greatly to be in the low electric power consumption state when operation is unnecessary, it is possible to achieve a reduction in the electric power consumption of the information processing apparatus 1.

Second Embodiment

Figure 5:
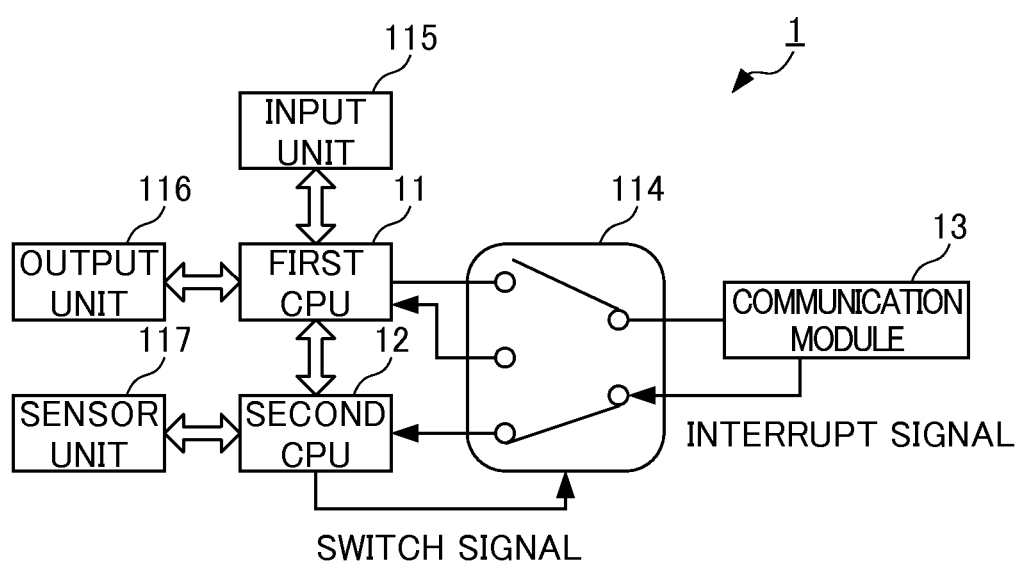
FIG. 5 is a block diagram illustrating a hardware configuration of an information processing apparatus according to a second embodiment of the present application.

FIG. 5 is a block diagram illustrating a hardware configuration of the information processing apparatus 1 according to a second embodiment of the present application.

The information processing apparatus 1 includes a first CPU 11, a second CPU 12, a communication module 13, a switch 114, an input unit 115, an output unit 116, and a sensor unit 117.

The first CPU 11 mainly controls the overall information processing apparatus 1 to perform communication with an external apparatus via a communication module 13, and execute various kinds of processing according to various programs. In the second embodiment, the first CPU 11 switches the electric power supply ON/OFF according to the control of the second CPU 12. The first CPU 11 is configured as a processor having an operation clock frequency of several hundred MHz to several GHz, or more, for example. For the first CPU 11, a general-purpose processor for a smartphone and a tablet PC, for example, can be used.

The second CPU 12 performs control for assisting the first CPU 11, and, in a predetermined set condition, turns OFF the electric power supply of the first CPU 11 or activates the first CPU 11. The second CPU 12 can be configured as a processor of lower electric power consumption than the first CPU 11, and for example, can be configured with a processor having an operation clock frequency of no more than several tens of MHz. For the second CPU 12, a microcomputer intended for an embedded device can be used, for example.

The communication module 13 performs wireless communication by way of Bluetooth according to the control of the first CPU 11 or the second CPU 12. In the second embodiment, the communication module 13 handles the two communication modes of legacy mode and low energy mode. Furthermore, when the communication module 13 receives a wireless signal from outside, the communication module 13 outputs an interrupt signal indicating the reception to the switch 114.

The switch 114 is a switch that switches to connect either of the first CPU 11 and the second CPU 12 with the communication module 13. To connect the communication module 13 with either the first CPU 11 or the second CPU 12 by way of the switch 114 is controlled by a switching signal inputted from the second CPU 12. It should be noted that the interrupt signal inputted from the communication module 13 is outputted to a side connected according to the switching signal, among the first CPU 11 or the second CPU 12.

The input unit 115 is configured with a microphone, various buttons, etc., and inputs various kinds of information according to a user's operation.

The output unit 116 is configured with a display, a speaker, etc. and outputs images and sounds.

The sensor unit 117 is configured by an acceleration sensor, a position sensor such as GPS (Global Positioning System), and the like.

It should be noted that, in addition to the abovementioned hardware, the information processing apparatus 1 can include as appropriate various kinds of hardware such as an image capture unit that captures images, a storage unit that stores various kinds of information and a drive of a removable medium.

Figure 6:
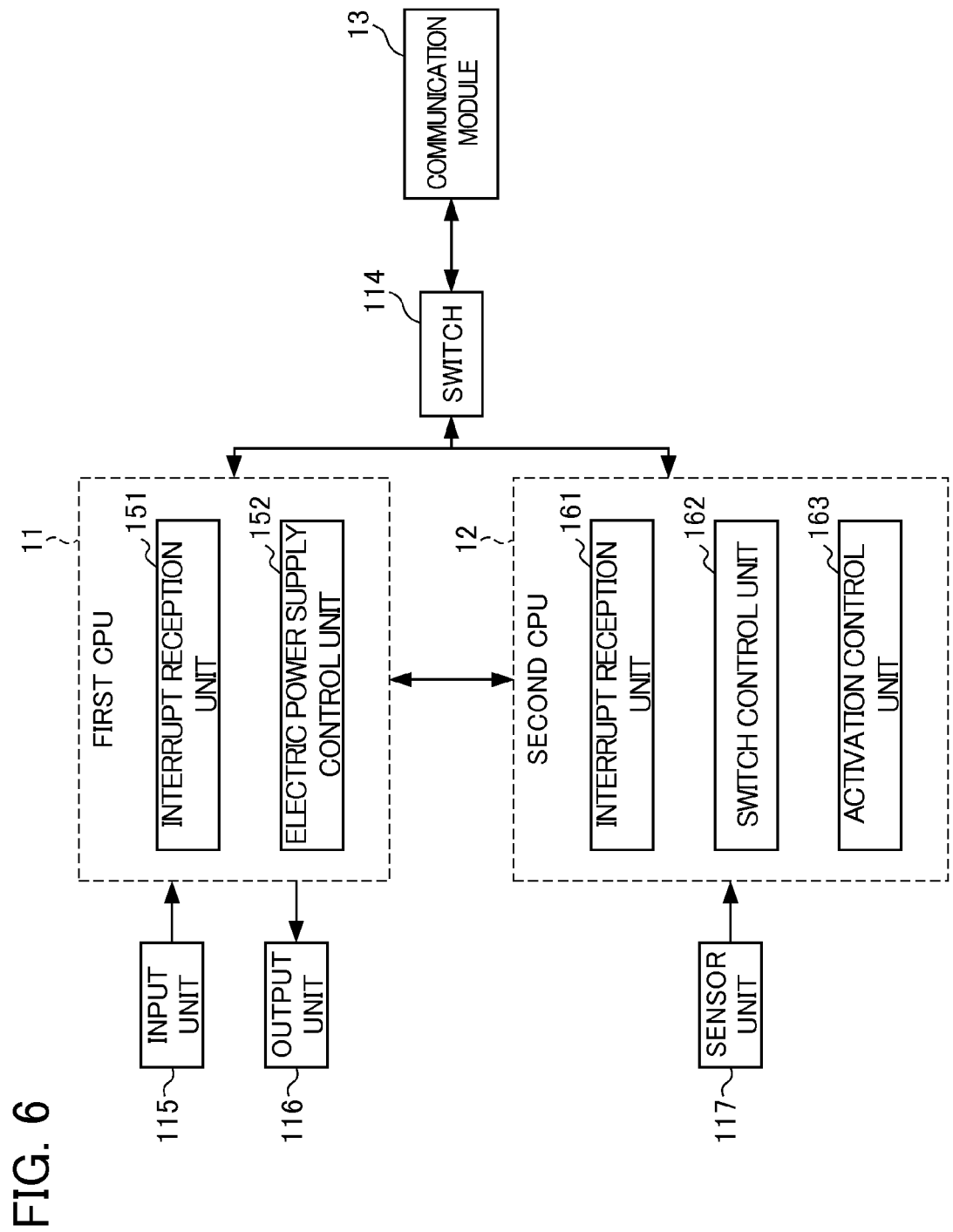
FIG. 6 is a functional block diagram illustrating a functional configuration for executing operation control processing among the functional configurations of the information processing apparatus of FIG. 5.

FIG. 6 is a functional block diagram illustrating a functional configuration for executing operation control processing among the functional configurations of the information processing apparatus 1.

Operation control processing refers to a sequence of processing of switching the electric power supply of the first CPU 11 ON/OFF, and switching a condition of a connection by the switch 114, according to conditions of the information processing apparatus 1.

When the operation control processing is executed, as illustrated in FIG. 6, an interrupt reception unit 151 and a power supply control unit 152 function in the first CPU 11 and an interrupt reception unit 161, a switch control unit 162, and an activation control unit 163 function in the second CPU 12.

The interrupt reception unit 151 receives an interrupt signal via the switch 114 from the communication module 13. When the interrupt reception unit 151 receives the interrupt signal from the communication module 13, the interrupt reception unit 151 causes the first CPU 11 to enter a state of performing output and input of signals with the communication module 13. In this way, the first CPU 11 enters a state of performing communication with an external apparatus via the communication module 13.

The electric power supply control unit 152 functions as a gate for electric power supply to the first CPU 11 and, when the electric power supply control unit 152 receives an electric power supply control signal (signal for turning ON or OFF the electric power supply) from the second CPU 12, the electric power supply control unit 152 turns ON or OFF the electric power supply in the first CPU 11.

In the second CPU 12, the interrupt reception unit 161 receives an interrupt signal inputted from the communication module 13 via the switch 114.

When the interrupt signal from the communication module 13 is received by the interrupt reception unit 161, the switch control unit 162 outputs a switching signal that indicates the first CPU 11 as the connection destination to the switch 114. Furthermore, in a case in which a condition of the information processing apparatus 1 matches a condition to turn OFF the electric power supply of the first CPU 11 (for example, a case in which a detection signal at the sensor unit 117 has not changed for a predetermined period of time and communication has not been performed via the communication module 13), the switch control unit 162 outputs a switching signal that indicates the second CPU 12 as the connection destination to the switch 114.

When the interrupt signal from the communication module 13 is received by the interrupt reception unit 161, the activation control unit 163 outputs an electric power supply control signal instructing activation by turning ON the electric power supply to the first CPU 11. Furthermore, when a condition of the information processing apparatus 1 matches a condition of the electric power supply of the first CPU 11 being turned OFF, the activation control unit 163 outputs an electric power supply control signal instructing the first CPU 11 to stop by turning OFF the electric power supply.

In this way, in a case in which the condition of the information processing apparatus 1 matches the condition of the electric power supply of the first CPU 11 being turned OFF, the information processing apparatus 1 turns OFF the electric power supply of the first CPU 11 and switches the connection destination of the switch 114 to the second CPU 12, and then the second CPU 12 enters a mode of receiving an interrupt signal from the communication module 13 (hereinafter, referred to as "low electric power supply consumption mode").

Next, operations will be explained.

Figure 7:
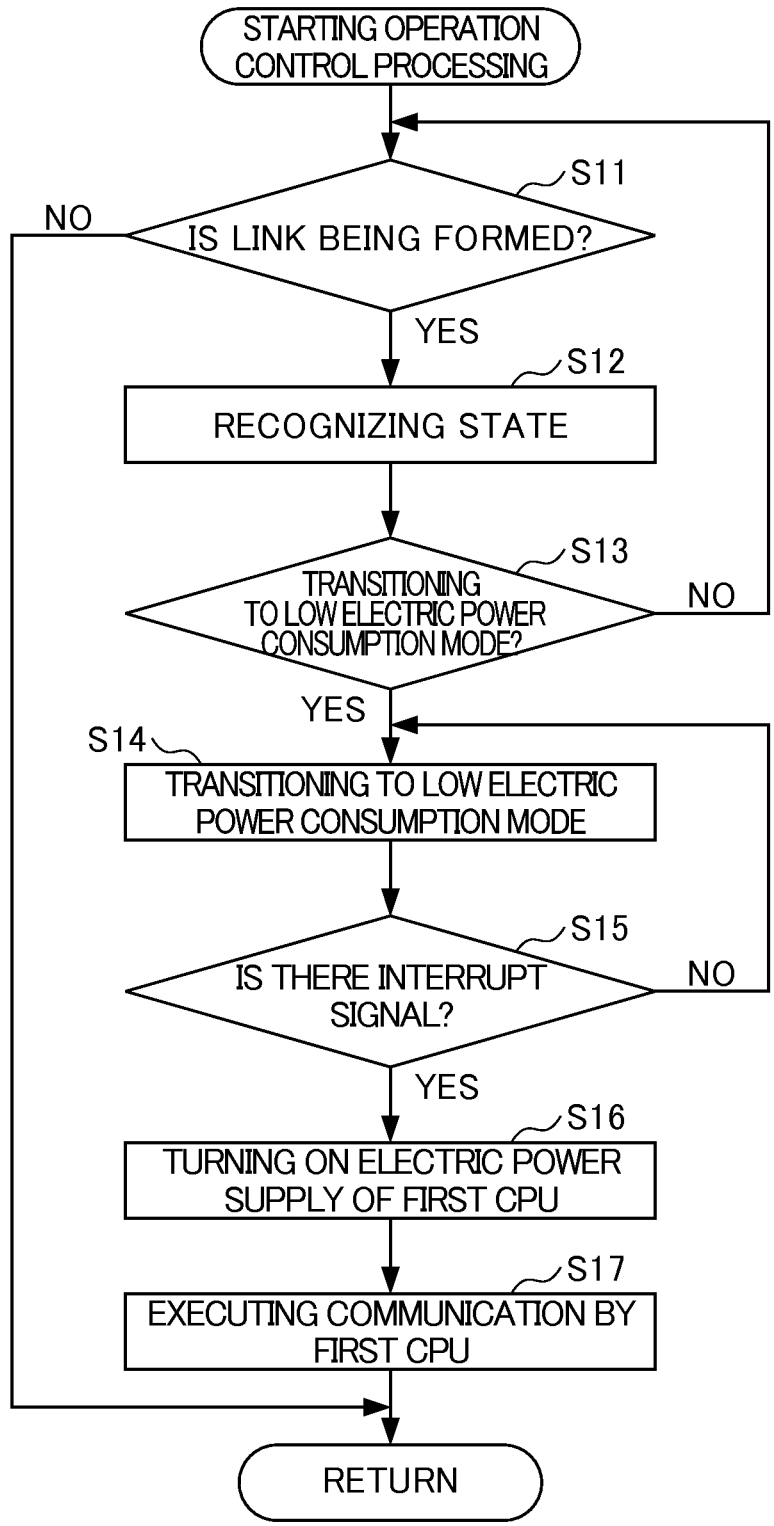
FIG. 7 is a flowchart illustrating a flow of operation control processing executed by the information processing apparatus of FIG. 5 having the functional configuration of FIG. 6.

FIG. 7 is a flowchart illustrating a flow of operation control processing executed by the information processing apparatus 1 of FIG. 5 having the functional configuration of FIG. 6.

The operation control processing is started in conjunction with power activation of the information processing apparatus 1, and is repeatedly executed until the electric power supply is turned OFF.

In Step S11, the activation control unit 163 of the second CPU 12 judges whether the communication module 13 has formed a link with an external apparatus.

In a case in which the communication module 13 has formed a link with an external apparatus, it is judged as YES in Step S11, and the processing advances to Step S12.

On the other hand, in a case in which the communication module 13 has not formed a link with an external apparatus, it is judged as NO in Step S11, and the operation control processing is repeated.

In Step S12, the activation control unit 163 of the second CPU 12 recognizes a state of a detection signal of the sensor unit 117 and an execution state of communication in the communication module 13.

In Step S13, the activation control unit 163 of the second CPU 12 judges whether the state of the information processing apparatus 1 matches a condition of the electric power supply of the first CPU 11 being turned OFF (whether to transition to the low electric power consumption mode), based on the state of the detection signal of the sensor unit 117 and the execution state of communication in the communication module 13 recognized in Step S12. More specifically, the activation control unit 163 of the second CPU 12 judges whether being a state in which the detection signal at the sensor unit 117 has not changed for a predetermined period of time and communication has not been performed via the communication module 13.

In a case in which the state of the information processing apparatus 1 matches the condition of the electric power supply of the first CPU 11 being turned OFF, it is judged as YES in Step S13, and the processing advances to Step S14.

On the other hand, in a case in which the state of the information processing apparatus 1 does not match the condition of the electric power supply of the first CPU 11 being turned OFF, it is judged as NO in Step S13, and the processing advances to Step S11.

In Step S14, the information processing apparatus 1 transitions to the low electric power consumption mode. More specifically, the switch control unit 162 of the second CPU 12 switches the connection destination of the switch 114 to the second CPU 12, the activation control unit 163 of the second CPU 12 turns OFF the electric power supply of the first CPU 11, and then the interrupt reception unit 161 of the second CPU 12 enters the state of receiving an interrupt signal from the communication module 13.

In Step S15, the interrupt reception unit 161 of the second CPU 12 judges whether an interrupt signal has been received from the communication module 13 via the switch 114.

In a case of having received the interrupt signal from the communication module 13 via the switch 114, it is judged as YES in Step S15, and the processing advances to Step S16.

On the other hand, in a case of not having received the interrupt signal from the communication module 13 via the switch 114, it is judged as NO in Step S15, and the processing advances to Step S14.

Is Step 16, the activation control unit 163 of the second CPU 12 turns ON the electric power supply of the first CPU 11. In this way, the electric power supply control unit 152 of the first CPU 11 activates the first CPU 11.

In Step S17, the first CPU 11 performs communication with an external apparatus via the communication module 13.

After Step S17, the operation control processing is repeated.

FIG. 8 is a schematic view illustrating an operation example of the information processing apparatus 1 when operation control processing is executed.

As illustrated in FIG. 8, during late-evening at which the information processing apparatus 1 is not being worn, the first CPU 11 is turned OFF and the second CPU 12 enters a state of receiving an interrupt signal from the communication module 13.

In such a case, the information processing apparatus 1 enters a state of operating with low electric power consumption in which only communication of simple signals can be performed such as an instruction for a vibration operation from a mobile phone of a connection destination, etc.

Then, when the communication module 13 receives a signal indicating an incoming call from a mobile phone of the connection destination, etc., an interrupt signal is outputted to the second CPU 12 from the communication module 13, and the second CPU 12 activates the first CPU 11. Furthermore, the second CPU 12 switches the connection destination of the switch 114 to the first CPU 11.

In this way, the information processing apparatus 1 enters a state of the first CPU 11 performing communication with a mobile phone of the connection destination, etc. via the communication module 13 (i.e. a normal state that allows for voice calls, etc.).

Thereafter, when the state of the information processing apparatus 1 not being worn continues, the second CPU 12 turns OFF the electric power supply of the first CPU 11, and then the second CPU 12 enters a state of receiving the interrupt signal from the communication module 13.

The information processing apparatus 1 configured as above includes the communication module 13, the first CPU 11, the second CPU 12, and the switch 114.

The communication module 13 performs wireless communication with an external apparatus.

The first CPU 11 can switch between a normal state and a low electric power consumption state that suppresses electric power consumption more than the normal state.

The second CPU 12 can operate with lower electric power consumption than the first CPU 11, and in case of the first CPU 11 being in the low electric power consumption state, the second CPU 12 receives an interrupt signal outputted by the communication module 13.

The switch 114 switches the connection destination of the communication module 13 to either the first CPU 11 or the second CPU 12 according to a switching signal inputted from the second CPU 12.

Once the second CPU 12 receives the interrupt signal, the second CPU 12 sets the first CPU 11 to be in a normal state, and switches the switch 114 to a state connecting the communication module 13 and the first CPU 11.

In this way, in the information processing apparatus 1, it is possible to set the electric power supply of the first CPU 11 which consumes more electric power to be in a state of low electric power consumption state, and in a case of the electric power supply of the first CPU 11 entering the low electric power consumption state, the second CPU 12 that can operate with lower electric power consumption receives an interrupt signal from the communication module 13.

Therefore, it is possible to achieve a reduction in electric power consumption more effectively in an information processing apparatus having a wireless communication function.

Furthermore, the information processing apparatus 1 includes the activation control unit 163.

The activation control unit 163 judges the state of the information processing apparatus 1.

In a case in which a judgment result by the activation control unit 163 matches a condition to cause the information processing apparatus 1 to transition to the low electric power consumption mode, the second CPU 12 sets the first CPU 11 to the low electric power consumption state, switches the switch 114 to be in a state connecting the communication module 13 and the second CPU 12, and enters a state of receiving an interrupt signal from the communication module 13.

In this way, in a case in which a state of the information processing apparatus 1 matches a predetermined condition, it is possible to transition the information processing apparatus 1 to the low electric power consumption mode.

Therefore, it is possible to set the information processing apparatus 1 to be in the low electric power consumption mode more effectively.

Furthermore, the information processing apparatus 1 includes the sensor unit 117.

The sensor unit 117 detects a physical amount (acceleration, for example) generated by an information processing apparatus being handled.

The activation control unit 163 judges whether being a state in which a physical amount detected by the sensor unit 117 has not changed for a predetermined period of time and communication via the communication module 13 has not been performed by the first CPU 11, as a condition for causing the information processing apparatus 1 to transition to the low electric power consumption mode.

In this way, it is possible accurately reflect the operating state of the information processing apparatus 1, and cause transition to the low electric power consumption mode.

Therefore, it is possible to achieve a reduction in electric power consumption more effectively in an information processing apparatus having a wireless communication function.

Furthermore, the normal state refers to a state of the electric power supply of the first CPU 11 being turned ON, and the low electric power consumption state refers to a state of the electric power supply of the first CPU 11 being turned OFF.

In such a way, it is possible to set the first CPU 11 to be in a lower electric power consumption state, and thus it is possible to achieve a reduction in electric power consumption more effectively.

Although it is configured so as to transition to the low electric power consumption mode in the case being a state in which the detection signal of the sensor unit 117 has not changed for a predetermined period of time and communication via the communication module 13 has not been performed in the abovementioned second embodiment, the conditions for transitioning to the low electric power consumption mode are not limited thereto.

For example, in a case of communication being performed in Legacy Mode in the communication module 13, it is possible to set a normal mode (a mode of the first CPU 11 performing communication), and, in a case of communication being performed in Low Energy Mode, it is possible to set to a low electric power consumption mode.

Furthermore, although it is configured so as to switch whether to turn ON or turn OFF the electric power supply of the first CPU 11 in the abovementioned embodiment, the present invention is not limited thereto. It may also be configured so as to switch between the normal state and the low electric power consumption state or a standby state which suppresses electric power consumption, for example. In other words, the present invention is not limited to such states of the electric power supply being turned ON or OFF, and it is sufficient so long as it is possible to switch between two states having different electric power consumptions.

It should be noted that the present invention is not to be limited to the aforementioned first and second embodiments, and that modifications, improvements, etc. within a scope that can achieve the objects of the present invention are also included in the present invention.

Furthermore, although an explanation is provided giving an example of a case in which the communication method of the communication module 13 is Bluetooth in the abovementioned first embodiment and the second embodiment, the present invention is not limited thereto. In other words, it is possible to apply the present invention to cases of using various methods of wireless communication such as infrared communication.

In the aforementioned first and second embodiments, explanations are provided with the example of the information processing apparatus 1 to which the present invention is applied being a wearable terminal; however, the present invention is not limited thereto in particular.

For example, the present invention can be applied to any electronic device in general having a wireless communication function. More specifically, for example, the present invention can be applied to a laptop personal computer, a television receiver, a video camera, a portable navigation device, a cell phone device, a smartphone, a portable gaming device, and the like.

The processing sequence described above can be executed by hardware, and can also be executed by software.

In other words, the hardware configurations of FIGS. 2 and 6 are merely illustrative examples, and the present invention is not particularly limited thereto. More specifically, the types of functional blocks employed to realize the above-described functions are not particularly limited to the examples shown in FIGS. 2 and 6, so long as the information processing apparatus 1 can be provided with the functions enabling the aforementioned processing sequence to be executed in its entirety.

A single functional block may be configured by a single piece of hardware, a single installation of software, or a combination thereof.

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM in which the program is recorded or a hard disk, etc. included in the storage unit.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An information processing apparatus, comprising:
    a communication unit that performs wireless communication with an external apparatus;
    a first control unit that switches between a normal state and a low electric power consumption state that suppresses electric power consumption to less than the normal state; and
    a second control unit that operates at lower electric power consumption than the first control unit,
    wherein the normal state is a state of an electric power supply of the first control unit being turned ON, and the low electric power consumption state is a state of the electric power supply of the first control unit being turned OFF, and
    wherein the information processing apparatus controls a connection state of the communication unit with the first control unit and the second control unit, based on a state of the information processing apparatus.

2. The information processing apparatus according to claim 1, wherein the second control unit is connected between the communication unit and the first control unit and performs data transfer by way of direct memory access, and
    wherein the communication unit, the first control unit, and the second control unit include input/output interfaces that input and output data in the same data format, respectively.

3. The information processing apparatus according to claim 2, wherein, in a case of a state of processing in the information processing apparatus matching a predetermined set condition, the second control unit sets the first control unit to be in the low electric power consumption state, and sets the second control unit to be in a state connected with the communication unit.

4. The information processing apparatus according to claim 3, wherein, in a case of processing that should be performed by the first control unit arising, the second control unit sets the first control unit to be in the normal state and connects the communication unit and the first control unit by way of the direct memory access via the input/output interface, and the second control unit enters a low electric power consumption state that suppresses to a lower electric power consumption than the normal state.

5. The information processing apparatus according to claim 1, further comprising:
    a switch unit that switches a connection destination of the communication unit between the first control unit and the second control unit according to a switching signal inputted from the second control unit,
    wherein, in a case of receiving an interrupt signal outputted by the communication unit, the second control unit sets the first control unit to be in the normal state and switches the switch unit to a state connecting the communication unit and the first control unit.

6. The information processing apparatus according to claim 5, further comprising:
    a state judgment unit that judges a state of the information processing apparatus,
    wherein, in a case of a judgment result by way of the state judgment unit matching a condition for causing the information processing apparatus to transition to a low electric power consumption mode, the second control unit sets the first control unit to be in the low electric power consumption state, switches the switch unit to a state of connecting the communication unit and the second control unit, and enters a state of receiving an interrupt signal from the communication unit.

7. The information processing apparatus according to claim 6, further comprising:
    a detection unit that detects a physical quantity generated by the information processing apparatus being handled,
    wherein, as a condition for causing the information processing apparatus to transition to a low electric power consumption mode, the state judgment unit judges whether the state of the information processing apparatus is a state in which a physical amount detected by the detection unit has not changed for a predetermined period of time and communication via the communication unit has not been performed by the first control unit.

8. An operation control method of an information processing apparatus, the information processing apparatus including (i) a communication unit that performs wireless communication with an external apparatus, (ii) a first control unit that switches between a normal state and a low electric power consumption state that suppresses electric power consumption to less than the normal state, the normal state being a state of an electric power supply of the first control unit being turned ON, and the low electric power consumption state being a state of the electric power SUM* of the first control unit being turned OFF, and (iii) a second control unit that operates at lower electric power consumption than the first control unit, and the method comprising:
    controlling a connection state of the communication unit with the first control unit and the second control unit based on a state of the information processing apparatus.

9. An information processing apparatus, comprising:
    a communication unit that performs wireless communication with an external apparatus;
    a first control unit that switches between a normal state and a low electric power consumption state that suppresses electric power consumption to less than the normal state; and
    a second control unit that operates at lower electric power consumption than the first control unit, wherein the second control unit is connected between the communication unit and the first control unit and performs data transfer by way of direct memory access, wherein the communication unit, the first control unit, and the second control unit include input/output interfaces that input and output data in the same data format, respectively, and wherein the information processing apparatus controls a connection state of the communication unit with the first control unit and the second control unit, based on a state of the information processing apparatus.

10. An information processing apparatus, comprising:

a communication unit that performs wireless communication with an external apparatus;

a first control unit that switches between a normal state and a low electric power consumption state that suppresses electric power consumption to less than the normal state;

a second control unit that operates at lower electric power consumption than the first control unit; and a switch unit that switches a connection destination of the communication unit between the first control unit and the second control unit according to a switching signal inputted from the second control unit, wherein, in a case of receiving an interrupt signal outputted by the communication unit, the second control unit sets the first control unit to be in the normal state and switches the switch unit to a state connecting the communication unit and the first control unit.

11. An operation control method of an information processing apparatus, the information processing apparatus including (i) a communication unit that performs wireless communication with an external apparatus, (ii) a first control unit that switches between a normal state and a low electric power consumption state that suppresses electric power consumption to less than the normal state, and (iii) a second control unit that operates at lower electric power consumption than the first control unit, the second control unit being connected between the communication unit and the first control unit and performing data transfer by way of direct memory access, and the communication unit, the first control unit, and the second control unit including input/output interfaces that input and output data in the same data format, respectively, and the method comprising:

controlling a connection state of the communication unit with the first control unit and the second control unit based on a state of the information processing apparatus.

12. An operation control method of an information processing apparatus, the information processing apparatus including (i) a communication unit that performs wireless communication with an external apparatus, (ii) a first control unit that switches between a normal state and a low electric power consumption state that suppresses electric power consumption to less than the normal state, (iii) a second control unit that operates at lower electric power consumption than the first control unit, and (iv) a switch unit that switches a connection destination of the communication unit between the first control unit and the second control unit according to a switching signal inputted from the second control unit, and the method comprising:

controlling a connection state such that, in a case of receiving an interrupt signal outputted by the communication unit, the second control unit sets the first control unit to be in the normal state and switches the switch unit to a state connecting the communication unit and the first control unit.

* * * * *

UNITED STATES PATENT AND TRADEMARK OFFICE
CERTIFICATE OF CORRECTION

PATENT NO. : 9,516,598 B2
APPLICATION NO. : 14/842974
DATED : December 6, 2016
INVENTOR(S) : Munetaka Seo et al.

It is certified that error appears in the above-identified patent and that said Letters Patent is hereby corrected as shown below:

In the Claims

Column 16, Line 49, delete "SUM*" and insert --supply--.

Signed and Sealed this
Twenty-eighth Day of March, 2017

Michelle K. Lee
*Director of the United States Patent and Trademark Office*